…

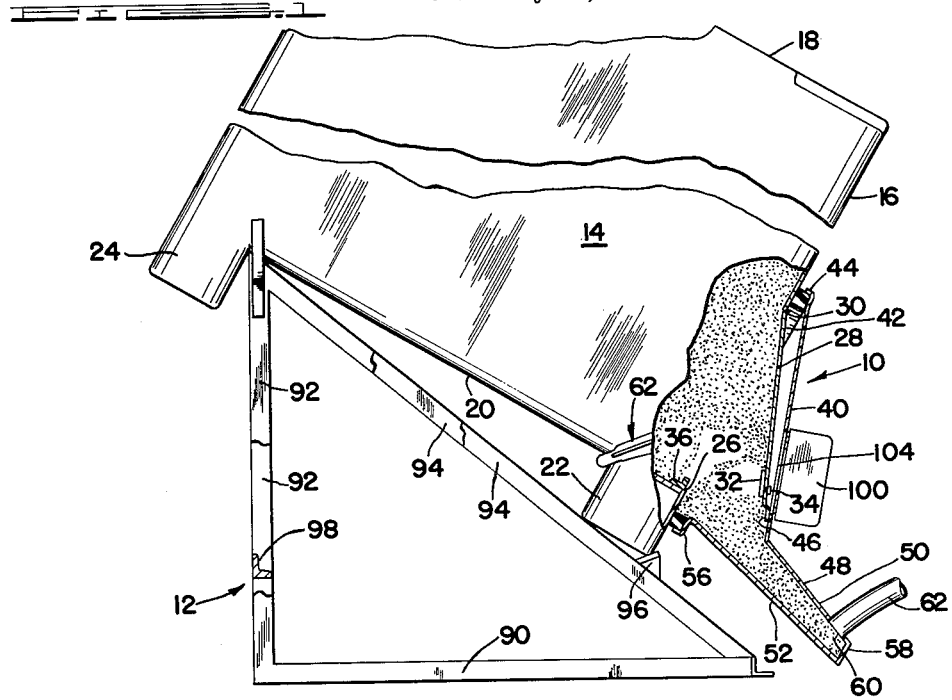
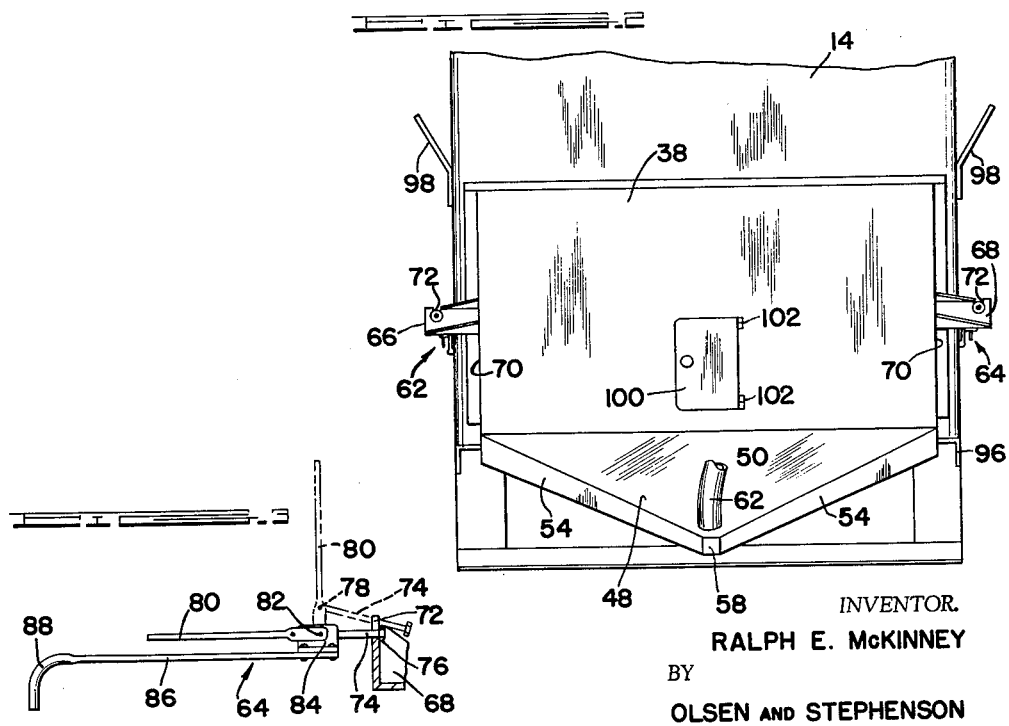

United States Patent Office 3,138,297
Patented June 23, 1964

3,138,297
APPARATUS FOR DISCHARGING BULK MATERIAL FROM BINS
Ralph E. McKinney, Beatrice, Nebr., assignor to Hoover Ball and Bearing Company, Saline, Mich., a corporation of Michigan
Filed May 15, 1962, Ser. No. 194,916
3 Claims. (Cl. 222—185)

This invention relates generally to bulk material handling systems and more particularly to apparatus for discharging bulk material from a transportation and storage bin.

The apparatus of this invention relates particularly to bulk material handling systems utilizing bins of the type shown in U.S. Patent No. 2,648,428, which have bulk material discharge openings in their front side walls. Various equipment has been devised for removing material from bins of this type, and this equipment is entirely satisfactory for most purposes. However, most of this equipment requires substantially permanent installation in a given location and requires power operation, and in some systems inexpensive portable apparatus for discharging material from bins of this or similar types is desirable. It is an object of this invention, therefore, to provide simple apparatus for discharging bulk material from bins which is portable and does not require power operation.

In the apparatus of this invention, a portable hopper is provided which has clamp assemblies attached thereto so that it can be readily applied to a bin at a position overlying the bin discharge opening and the bin door which normally closes the opening. The clamp assemblies are constructed so that they can be readily applied to the hopper to securely attach it to the bin in the desired position, and can be readily detached for moving the hopper from one bin to another. The portable hopper has a downwardly and forwardly diverging hollow body portion which receives bulk material from the bin and a converging spout portion which communicates with the body portion so as to direct bulk material from the body portion to a localized discharge position. The spout portion is provided with a discharge opening at this position so that all of the bulk material in the bin can be readily removed at this localized point. Furthermore, the portable hopper is provided with a door opening through which access is readily obtained to the bin discharge door after the hopper has been mounted on the bin so that the door can be opened to provide for flow of bulk material from the bin into the hopper.

Either before or after the hopper is applied to the bin, the bin is moved to a supported position on a simple stand which supports the bin in a forwardly inclined position in which the material in the bin will readily flow out the bin discharge opening and into the hopper. As a result, the apparatus of this invention is usable without any auxiliary power equipment, other than a fork lift or the like which is used to move the bin to a supported position on the stand, to completely discharge a bin.

Further objects, features and advantages of this invention will become apparent from a consideration of the following description, the appended claims, and the accompanying drawing in which:

FIGURE 1 is a side elevational view of the apparatus of this invention, shown in assembly relation with a bin which has been moved to a discharge position, and illustrating the portable hopper in the apparatus of this invention in section for purposes of clarity;

FIGURE 2 is a foreshortened front elevational view of the apparatus shown in FIG. 1; and FIGURE 3 is an elevational view of a clamp assembly in the apparatus of this invention, showing the assembly in a locking position in full lines and in an unlocking position in broken lines, and showing the clamp assembly mounted on a bracket on the portable hopper in the apparatus of this invention.

With reference to the drawing, the apparatus of this invention, which consists of a portable hopper, indicated generally at 10, and a stationary bin supporting stand, indicated generally at 12, are shown in FIG. 1 in assembly relation with a bin 14 which is in a forwardly tipped supported position on the stand 12. The bin 14 has a front wall 16, a top wall 18, a bottom wall 20, a pair of front supporting legs 22 which extend downwardly from the front corners of the bottom wall 20 and only one of which is shown, and a pair of rear legs 24 which extend downwardly from the rear corners of the bottom wall 20 and only one of which is shown.

The bin 14 is of the type shown in U.S. Patent No. 2,648,428, assigned to the assignee of this application, and has a discharge opening 26 formed in its front side wall 16 at a position adjacent the bottom wall 20. A door 28 is mounted at its upper end on a hinge assembly 30 carried by the bin front wall 16 so that the door 28 is movable between a position closing the opening 26 and a forwardly pivoted open position shown in FIG. 1 in which it does not interfere with discharge of material from the bin 14 through the opening 26. A door locking cam 32 is mounted on a shaft 34 which extends forwardly through the door 28 and is engageable with a latch dog 36, when the door 28 is closed and the shaft 34 is rotated, to lock the bin door 28 in a closed position. On rotation of the shaft 34, which is accessible on the outer side of the door 28 and is readily rotated by use of a suitable tool (not shown), the cam 32 may be disengaged from the dog 36 so that the door 28 can be moved to its open position shown in FIG. 1.

The portable hopper 10 includes a generally rectangular body portion 38 which has a front wall 40 and an open rear side 42 bounded by a rectangular flange 44. A compressible seal member 56 is mounted in the flange 44 for a purpose to appear presently. The front wall 40 is arranged in a downwardly diverging relation with the hopper rear side 42 so that when the bin 14 has its legs 22 and 24 supported on a horizontal surface, the front wall 40 extends downwardly and forwardly from the bin front wall 16. As a result, when the bin 14 is supported in a forwardly tipped position on the stand 12 as shown in FIG. 1, the bin door 28 may be moved to an open position in which the lower end 46 of the door 28 engages the hopper front wall 40, and in this position the bin door 28 is substantially vertical and does not interfere with a free flow of the bin contents through the door opening 26 into the hopper body portion 38.

The portable hopper 10 also includes a spout portion 48 which has a generally triangular top wall 50 and a similarly shaped bottom wall 52, and side walls 54. The spout portion 48 is shaped so that its walls converge in a direction extending away from the body portion 38. As a result, bulk material flowing from the body portion 38 is directed by the spout portion 48 to a localized position at the front end 58 of the spout portion 48. In the illustrated embodiment of the portable hopper 10, the spout portion 48 is angularly related to the body portion 38 and is provided in its top wall 50 with a discharge opening 60 located adjacent the front end 58 of the spout portion 48. A suction tube 62 is fitted in the discharge opening 60 for withdrawing material from the spout portion 48.

It can thus be seen that the portable hopper 10 functions to direct the bulk material in the bin 14 to a localized position at the terminal end of the hopper spout portion 48 so that all of the bin contents can be removed through the opening 60. It is to be understood that the opening 60 may be located at other positions in the spout portion 48 adjacent the front end 58 thereof, depending on the requirements of the system in which the apparatus 10 is used.

In the assembly of the portable hopper 10 with the bin 14, the hopper 10 is positioned so that the seal member 56 is against the bin front wall 16 at a position surrounding the discharge door 28 and the discharge opening 26 and at a position such that the spout portion 48 is at the lower end of the body portion 38. A pair of clamp assemblies 62 and 64 are then assembled with mounting brackets 66 and 68 secured to and extending outwardly from opposite side walls 70 of the hopper 10 (FIG. 2), and each bracket 66 has an upwardly opening slot 72 formed therein. Since the clamp assemblies 62 and 64 are substantially identical, being only left and right hand variations of each other, only the assembly 64, which is shown in detail in FIG. 3, is explained in detail herein. The assembly 64 includes a rod 74 which is of a size to fit in a slot 72 and is provided on one end with an enlarged head 76 which is of a size such that it will not pass through the slot 72, and may conveniently take the form of a nut. The opposite end of the rod 74 is secured by a pivot member 78 to a handle member 80. The pivot member 78 is connected to the handle member 80 at a position intermediate the ends of the handle member 80 which is pivotally mounted at one end by a pin 82 on a bracket 84 secured to one end of an elongated shank 86. The opposite end of the shank 86 is provided with a hook-shaped portion 88 of a shape to be engaged with the rear side of a bin front leg 22 at a position adjacent the juncture of the leg 22 and the bin bottom wall 20.

In mounting the hopper 10 on the bin 14, the clamp assemblies 62 and 64 are positioned so that the rods 74 thereon are positioned in the bracket slots 72, with the handle 80 in each assembly in its unlocked position shown in broken lines in FIG. 3. The shanks 86 are then extended rearwardly and downwardly along opposite sides of the bin 14 and the hook portions 88 are then engaged with the bin front legs 22. Each handle 80 is moved to its locking position so as to move the head 76 and the hook portion 88 associated therewith toward each other to thereby compress the seal 56 and provide for a secure attachment of the hopper 10 to the bin front wall 16.

In order to discharge the contents of the bin 14 from the portable hopper 10, the bin 14 is moved to a supported position on the stand 12 which includes a substantially horizontal base frame 90, a pair of spaced upright posts 92 which project upwardly from the rear end of the base frame 90, and a pair of forwardly and downwardly inclined bin engaging frame members 94 which extend between the upper ends of the posts 92 and the front end of the frame 90. The stand includes a pair of stop members 96, only one of which is shown, each of which is secured to one of the frame members 94 adjacent the lower end thereof and a generally horizontal brace member 98 which is connected to and extends between the posts 92 at substantially the level of the stop members 96. Upwardly diverging guide straps 98 are secured to the outer sides of the posts 92 for guiding a bin 14 into a supported position on the stand 12.

The loaded bin 14 is raised, by means of a fork lift truck, or the like, to a level above the upper ends of the posts 92 and is then moved forwardly to a position above the supporting frame members 94 which are spaced apart a distance corresponding to the spacing of the legs 22 so that the legs 22 can be supported thereon. The fork lift is then lowered between the posts 92 so that the bin bottom wall adjacent the rear legs 24 is lowered onto the upper ends of the frame members 94. On further lowering of the fork lift and the bin 14, the front legs 22 are lowered onto the frame members 94 at positions against the stop members 96. The bin discharge door 28 may then be opened by opening a door 100 mounted on the hopper front wall 40 on hinges 102. The door 100 normally covers an opening 104 in the hopper wall 40 so that when the door 100 is opened access to the bin door shaft 34 is readily obtained through the opening 104 which is substantially horizontally aligned with the shaft 34 in the position of the hopper 10 shown in FIG. 1. Once the bin contents have been fully discharged through the hopper discharge opening 60, the bin 14 is readily removed from the stand 12 by moving the fork lift on a truck forwardly across the brace member 98 and into engagement with the bin bottom wall 20.

It will be understood that the apparatus for discharging bulk material from bins which is herein disclosed and described is presented for purposes of explanation and illustration and is not intended to indicate limits of the invention, the scope of which is defined by the following claims.

What is claimed is:

1. For use with a bin having a lower end provided with front and rear supporting legs and a front side wall provided with a discharge opening disposed adjacent said lower end; a portable hopper adapted to be attached to said bin in communication with said discharge opening when it is desired to discharge said bin contents, said hopper having a body portion and a spout portion communicating therewith, said hopper having an open rear end positioned in engagement with said bin front wall at a position surrounding said opening, a pair of clamp assemblies connected to opposite sides of said hopper for mounting said hopper in said position on said bin, each of said clamp assemblies having one end removably attached to said hopper and having a hook shape portion at the opposite end adapted to be engaged with the rear side of a front bin supporting leg when said hopper rear end is positioned in engagement with said bin front wall and means for selectively moving said clamp assembly ends toward each other, said spout portion communicating with said body portion adjacent the lower end thereof and having walls which converge in a direction extending away from said body portion and which extend downwardly from said body portion in a forwardly tipped position of said bin.

2. Apparatus for discharging the contents of a bin which has a lower end, a front side wall provided with a discharge opening disposed adjacent said lower end, a hinged closure for said opening, and latch means having actuating means disposed on the outer side of said closure; said apparatus comprising a supporting stand for said bin engageable with the lower end thereof to support said bin in a forwardly tipped position, a hopper having a body portion and a spout portion communicating therewith, said hopper having an open rear end positioned in engagement with said bin front wall at a position surrounding said opening and a front wall provided with a opening disposed in substantially horizontal alignment with said actuating means in said tipped position of said bin, closure means on said hopper front wall for closing said opening, clamp means connected to opposite sides of said hopper and engaged with said bin for mounting said hopper in said position on said bin, said spout portion communicating with said body portion adjacent the lower end thereof and extending downwardly therefrom in said tipped position of said bin, said spout portion having walls which converge in a direction downwardly from said body portion, and means forming a discharge opening in said spout portion adjacent the lower end thereof.

3. For use in discharging the contents of a bin which has a lower end, a front side wall provided with a discharge opening disposed adjacent said lower end, a movable closure for said opening, and latch means having actuating means disposed on the outer side of said closure; a portable hopper having a body portion and a spout portion communicating therewith, said body portion having an open rear end adapted to be positioned in sealing engagement with said bin front wall at a position surrounding said discharge opening, said body portion having a front wall provided with an opening disposed in substantially horizontal alignment with said actuating means in a forwardly tipped position of said bin, closure means on said body portion front wall for closing said opening therein, a pair of clamp members connected at one of their ends to opposite sides of said body portion and adapted to be engaged at their opposite ends with said bin for mounting said hopper in said position on said bin, said spout portion communicating with said body portion adjacent the lower end thereof and extending downwardly therefrom in said forwardly tipped position of the bin, said spout portion having walls which converge in a direction downwardly and forwardly from said body portion, and said spout portion having a discharge opening therein adjacent the lower end thereof.

References Cited in the file of this patent

UNITED STATES PATENTS

| | | |
|---|---|---|
| 247,547 | Eiseman | Sept. 27, 1881 |
| 2,550,856 | Ouellet et al. | May 1, 1951 |
| 2,670,108 | Skogstad et al. | Feb. 23, 1954 |
| 2,762,529 | Johnson | Sept. 11, 1956 |
| 2,973,122 | Heinz | Feb. 28, 1961 |

FOREIGN PATENTS

| | | |
|---|---|---|
| 944,112 | France | Oct. 25, 1948 |
| 730,631 | Great Britain | May 25, 1955 |